US008097544B2

(12) United States Patent
Majors

(10) Patent No.: US 8,097,544 B2
(45) Date of Patent: *Jan. 17, 2012

(54) RATED FIRE FRAME AND DOOR FRAME / JAMB

(76) Inventor: Kenneth Majors, Denver, CO (US)

( * ) Notice: Subject to any disclaimer, the term of this patent is extended or adjusted under 35 U.S.C. 154(b) by 499 days.

This patent is subject to a terminal disclaimer.

(21) Appl. No.: 12/378,940

(22) Filed: Feb. 20, 2009

(65) Prior Publication Data

US 2009/0241465 A1 Oct. 1, 2009

Related U.S. Application Data

(60) Provisional application No. 61/072,631, filed on Apr. 1, 2008.

(51) Int. Cl.

| | |
|---|---|
| *B32B 5/02* | (2006.01) |
| *B32B 17/02* | (2006.01) |
| *B32B 3/00* | (2006.01) |

(52) U.S. Cl. ........ 442/136; 442/180; 428/210; 428/215; 428/218

(58) Field of Classification Search .................. 442/136, 442/180

See application file for complete search history.

(56) References Cited

U.S. PATENT DOCUMENTS

| | | | | |
|---|---|---|---|---|
| 7,279,437 | B2 * | 10/2007 | Kai et al. | 442/136 |
| 7,655,580 | B2 * | 2/2010 | Majors | 442/136 |
| 2006/0048466 | A1 | 3/2006 | Darnell | |
| 2006/0207199 | A1 | 9/2006 | Darnell | |

* cited by examiner

*Primary Examiner* — Lynda Salvatore
(74) *Attorney, Agent, or Firm* — Emery L. Tracy

(57) ABSTRACT

The present invention teaches that a tightly woven, and strong layer of fiberglass may be coated or impregnated with sodium silicate in order to produce a strong and fire resistant jamb/frame. The present invention further teaches that a fire door-jamb core may be mass produced from fire resistant layers and the frame core rated for fire safety by a rating agency, thus allowing builders and door manufacturers to produce building structures and doors using that core without individually certifying each model of door or structure. The present invention further teaches a structure/method of mounting for door frames which closely parallels mounting of normal door frames, without special brackets or plates.

12 Claims, 20 Drawing Sheets

PRIOR ART

PRIOR ART

RATED FIRE FRAME AND DOOR FRAME / JAMB

CROSS-REFERENCE TO RELATED APPLICATIONS

This application claims the priority and benefit of U.S. Provisional Patent Application No. 61/072,631, Apr. 1, 2008, in the name of the same inventor, Kenneth A. Majors, entitled RATED FIRE DOOR FRAME AND DOOR JAMB, the entire disclosure of which is incorporated herein by this reference. This application also claims the priority and benefit of U.S. patent application Ser. No. 11/974,177, now U.S. Pat. No. 7,655,580, filed Oct. 10, 2007 in the name of the same inventor, Kenneth A. Majors, and entitled IMPROVED FIRE RESISTANT PANEL AND METHOD OF MAKING, the entire disclosure of which is incorporated herein by this reference.

STATEMENT REGARDING FEDERALLY FUNDED RESEARCH

This invention was not made under contract with an agency of the US Government, nor by any agency of the US Government.

FIELD OF THE INVENTION

This invention relates generally to fire building materials including door frames and jambs and specifically to fire resistant door jambs and door frames of sodium silicate.

BACKGROUND OF THE INVENTION

Building frames and structures such as fire doors, jambs, frames, walls and related structures for commercial buildings must meet certain local building standards, depending upon nation, state and other level of jurisdiction regulations. In general, fires must withstand a given level of heat on one face for a given amount of time. During this time, the door must also block passage of smoke around its periphery, maintain structural strength and so on. Failure of the door itself, the structures around the door, the door frame, jamb and so on will result in the door failing it's rating test and being denied regulatory and/or underwriting approval for use as a fire door system.

The present invention is a building material suitable for building construction such as framing, door frame/jamb systems and so on, however, it is the interaction of the frame and door which makes the present invention commercially desirable.

However, obtaining fire door rating is an expensive and time consuming process. A door or frame manufacturer must first construct the door or frame. The interior of the frame or door is normally a laminate or series of layers of various types of structural and fire resistant materials, this interior is called the "core" of the frame. After the door/frame manufacturer has made the core/door/frame, they then add panels, stiles, rails, and other material to the outside facings of the door or frame to provide it with an appearance suitable for commercial use: expensive wood materials, 6 panel arrangements, spots for name plates and so on. This is important as most fire rated frames are distinctly unattractive steel construction. Then the manufacturer sends the frame or door to the rating agency for testing. The rating agency will take the frame and/or door, place it in what amounts to a large furnace, and begin exposing one side to flame and extremes of heat. In one testing arrangement, after the assembly has passed the time rating (for example 60 minutes, 20 minutes, etc) without allowing excess heat to reach the "cool" side, it is then required to pass a structural test involving shooting water from a fire hose for a specified amount of time at the burning side of the door to see if the door or frame collapse under this heavy load.

It is important to understand that due to the constraints on the size and shape of the frame, it is extremely difficult to build a frame of material other than steel. However, placing an expensive wood door of attractive appearance into a steel frame is visually unfortunate. But this unappealing combination is so hard to avoid that in fact the vast majority of office building doors are set into steel frames. FIG. 16 is a simplified diagram of a (PRIOR ART) attractive, decorative and probably expensive office doorway with two fire rated wooden doors 1402 and an ugly steel frame 1404 also designed to pass fire rating tests. This odd combination is quite prevalent.

This testing requirement imposes costs and labor upon door manufacturers. In effect, each model of door must be individually certified to be fire resistant before it can be sold. Interestingly, the door jamb and door frame are normally sold as separate systems, that is, the maker of the door may not make the frame, even though door jambs and door frames must also be fire resistant. (Different regulatory categories of doors have different regulatory situations: some doors have proprietary frames, some require no edge sealing, and some require edge sealing in addition to whatever edge sealing may be offered by the door itself.) As door frames are structurally extremely different from door panels, the fact is that they are often considered separate devices. (The door is the swinging panel mounted on hinges. The frame and jamb, on the other hand, are considered to be parts of a wall and are constructed as part of the wall. Eventually, a door is purchased and "hung" into the hole in the wall defined by the wall frame and jamb.) However, unfortunate effects result from this division.

One of the least esthetically pleasing effects of fire door rating occurring separately from wall, frame and jamb regulation is that the builder normally builds a frame per standard code regulations before inserting a door which has been separately purchased. The door and frame in fact do not match. Commercial properties such as office buildings or hotels normally have very expensive and decorative fire doors having heavy wooden layers with elaborate panels and other decoration thereon, while the frame built to local code is, as commented previously, simply a steel box structure either painted to match the wall or else painted in a neutral color approximating that of a door but not matching the actual door.

It would be preferable if door frames and door jambs could be manufactured to match the doors which will sit within them.

It would further be preferable if door frames and jambs could be pre-certified and yet decorative in appearance.

Sodium silicate is an extremely useful material for door and door accessory manufacturers and construction workers making door frames, when they are attempting to make doors with the necessary fire resistance. Sodium silicate may be any one or a mixture of several compounds having silica (Si2O) and Sodium oxide (Na2O). Forms of "soluble glass" or "water glass" include sodium disilicate, sodium metasilicate, sodium orthosilicate, sodium tetrasilicate and so on. These may be produced by combining sand and sodium carbonate. Considered a non-hazardous substance (MSDS standards) it does require gloves for handling, as it is extremely destructive of human mucus membranes and may theoretically even cause burns on skin contact.

Importantly, sodium silicates have high melting points and are water soluble. More importantly, when exposed to heat, hydrated sodium silicate absorbs the heat and uses it for a phase transformation. Like water boiling from liquid to gas and maintaining a temperature of 100 degrees C. during the process, sodium silicate changes form, unlike water, the sodium silicate does not boil away or change from a liquid to a gas.

Exposed to heat, several energy absorbing changes occur in hydrated sodium silicate. Firstly, it begins to give up the water molecules trapped within it. The boiling away water molecules carry away a good deal of heat, but crucially the second effect is that the sodium silicate expands (intumesces) from a relatively solid form into a glass foam containing numerous cavities and pockets. This transformation itself absorbs heat and the result is a notably thicker mass of an excellent insulator having a melting point above 800 degrees C. (circa 1500 degrees Fahrenheit). The thickness change is very dramatic: a ratio of six to one expansion is possible.

The form of sodium silicate panel known for use in fire door construction is available from only one major source, the European company BASF, which has an ancillary operation producing sodium silicate in the form of PALUSOL brand fire board. (Trademark of BASF, not associated with present applicants.)

PALUSOL brand panel is a mixture of solid sodium silicate with a low percentage of dissociated strands of fiberglass fabric mixed in, sold in sheets large enough to individually span the width and height of a typical door. While the fiberglass strands provide some limited degree of strength, BASF specification sheets for PALUSOL brand panel state that there is a risk of breakage as a single panel is transported by itself, and that it must be stored laid flat. Sodium silicate is normally translucent, the PALUSOL building product panels are white. A PALUSOL brand panel must be finished by coating of both sides with epoxy. The PALUSOL water content will otherwise evaporate over time, a tendency so marked that PALUSOL brand panel must even be coated at the edges with epoxy yet despite all efforts and expense, panels of PALUSOL brand panel still degrade over time.

US Patent Application Publication No. 20060207199 published Sep. 21, 2006 in the name of Darnell, and US Patent Application Publication No. 20060048466 published Mar. 9, 2006 in the name of the same inventor teach devices integrating PALUSOL into doorjambs or vertical stiles within a door panel itself. However, the doorjamb of the '466 reference (sold under the TRADE NAME WARM SPRINGS™ (trademark owner not affiliated with present applicant) requires special flexible brackets for use, due to the difficulty of attaching the jamb to the wall. The system uses PALUSOL strips on the sides of the base portion.

It would be preferable to provide a door jamb/frame system not requiring special brackets and offering easy mounting during building construction or remodeling.

It would be preferable to provide a door jamb and door frame not requiring individual certification of each model.

It would further be preferable to provide a product having better thermal protection than panels of sodium silicate with loose fiberglass therein (PALUSOL), and to provide this product in the structures around the door itself.

SUMMARY OF THE INVENTION

General Summary

The present invention teaches that a tightly woven, and strong layer of fiberglass may be coated or impregnated with sodium silicate in order to produce a strong and fire resistant frame or doorjamb/door frame. The present invention further teaches that a fire doorjamb core or other building structure may be mass produced from fire resistant layers and the frame core rated for fire safety by a rating agency, thus allowing building manufacturers and door manufacturers to produce buildings, doors and jambs using that core without individually certifying each frame or model of door or jamb. The present invention further teaches a method of mounting which closely parallels mounting of normal door frames, without special brackets or plates.

The present invention further teaches that a tightly woven, and strong panel of fiberglass may be impregnated with sodium silicate in order to produce a strong and fire resistant panel, and that this panel may then be used in construction of door jambs and door frames.

Summary in Reference to Prototypical Claim

It is therefore yet another aspect, advantage, objective and embodiment of the present invention, in addition to those detailed previously, to provide a fire resistant frame core, the core comprising:

first and second tightly woven fiberglass layers each treated with at least 0.01 gallons of approximately 20% hydrated sodium silicate per square foot of tightly woven fiberglass layer;

a third structural support layer interposed between the first and second layers; the layers secured together.

It is therefore yet another aspect, advantage, objective and embodiment of the present invention to provide a fire resistant frame core, wherein the maximum width of the core is 24 inches.

It is therefore another aspect, advantage, objective and embodiment of the present invention to provide a fire resistant frame core, wherein the minimum thickness of the core is 0.1 inches.

It is therefore another aspect, advantage, objective and embodiment of the present invention to provide a fire resistant frame core, further comprising:

a first edge layer disposed at a first edge of the frame core, the first edge layer being oriented at 90 degrees to the first, second and third layers, the first edge layer being the same material as the first and second treated fiberglass layers; and a second edge layer also disposed a the first edge of the frame core, the first edge layer also oriented at 90 to the first, second and third layers, the second edge layer being the same material as the third structural support layer.

It is therefore another aspect, advantage, objective and embodiment of the present invention to provide a fire resistant frame core, wherein the third structural support layer further comprises one member selected from the group consisting of: solid wood, MDF, plastic, polymer, composite, OSB, cardboard, HDF, particle board, gypsum, plywood, steel, metal and combinations thereof.

It is therefore another aspect, advantage, objective and embodiment of the present invention to provide a fire resistant frame core, further comprising:

fourth and fifth treated fiberglass layers parallel and fastened to the first, second and third layers, a sixth structural support layer and third and fourth edge layers disposed at a second edge of the frame core and also oriented at 90 degrees to the first, second and third layers.

It is therefore another aspect, advantage, objective and embodiment of the present invention to provide a fire resistant frame core, further comprising:

an adhesive compound to secure the layers together.

It is therefore another aspect, advantage, objective and embodiment of the present invention to provide a fire resistant frame core, wherein the adhesive comprises: approximately 40% hydrated sodium silicate.

It is therefore another aspect, advantage, objective and embodiment of the present invention to provide a fire resistant frame core, wherein the first tightly woven fiberglass layer further comprises:

chop strand, woven roving, pressed fiberglass, fiberglass fabric, fiberglass veil, and combinations thereof.

It is therefore another aspect, advantage, objective and embodiment of the present invention to provide a fire resistant frame core, further comprising:

an additional layer of structural support, the additional layer of structural support being silica fabric.

It is therefore another aspect, advantage, objective and embodiment of the present invention to provide a fire resistant frame core, further comprising:

at least one decorative exterior layer.

It is therefore another aspect, advantage, objective and embodiment of the present invention to provide a fire resistant frame core, the core comprising:

first and second structural support layers;

a third tightly woven fiberglass layer treated with at least 0.01 gallons of approximately 20% hydrated sodium silicate per square foot of tightly woven fiberglass layer;

the third layer interposed between the first and second layers; and the layers secured together.

INDEX TO REFERENCE NUMERALS

Figure 1:
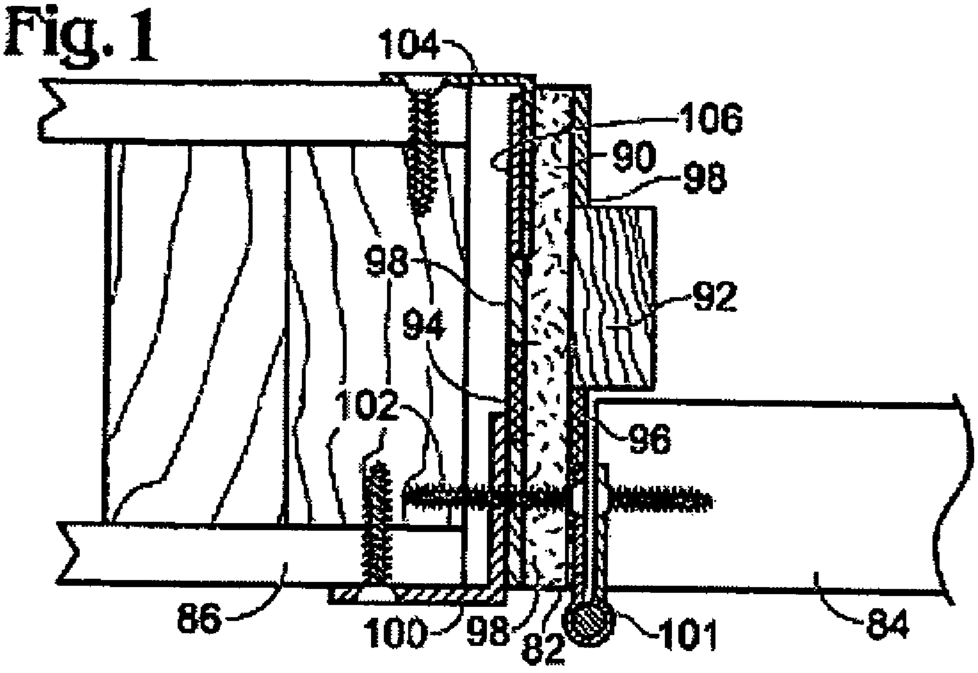
FIG. 1 is a PRIOR ART cross-sectional view

Jamb area 80
Jamb 82
Door 84
Wall 86
Base fire-resistant board 90
Stop 92
Intumescent strips 94, 96
Hard board layer 98
Special brackets 100, 104
Hinge 101
Screws 102
Metal plate 106
Jamb system 200
Base portion 202
Wood stop 204
Intumescent strips (PALUSOL™ 206, 208
Veneer 212
Wood ends 214, 216
Metal stud 12
Wallboard 14
Screw 16
Casing trim 18
Shim space 20
Caulk 22
Fire resistant jamb core 24
Nail 26
Stop 28
Door 30
Hinge 32
Nail 34
Plywood panel 36
Long screw 38
Metal stud 112
Wallboard 114
Screw 116
Casing trim 118
Shim space 120
Fire resistant jamb core 124
Nail 126
Stop 128
Nail 134
Plywood panel 136
Long screw 138
Door 302
Stop 304
Core 306

Fire resistant edge 308, 310
Solidwood 312, 314
Core 406
Fire resistant edge 410
MDF 412
Veneer 416
Core 512
MDF/Wood 514
Wood 516
Fire resistant edge 518, 520
Core 612
MDF/Wood stop 614
Wood 616
Fire resistant edge 618, 620
Veneer 622, 624
MDF 626, 628
Core 712
Hinges 730, 732
Doors 734, 736
Jamb legs 840, 842
Header 844
Groove/rabbet 846
Nail/screw 848
Decorative wood 902
Fire resistant ss/fg edge 904, 906
Sodium silicate/fiberglass layers 908, 910
Structural support layers 912
Structural support edge layers 914
Decorative Wood 1002
Sodium Silicate/Fiberglass Layers 1008, 1010
Structural Support Layer 1012
Decorative Wood 1102
Structural Support Layers 1150
Silica Fabric Layers 1152
Sodium Silicate/Fiberglass Layers 1154 (except as otherwise marked)
Masonry wall 1210
2×4 stud 1212
Wallboard 1214
Screw 1216
Caulk 1222
Fire resistant jamb core 1224
Nail 1226
Stop 1228
Door 1230
Nail 1234
Long screw 1238
Masonry anchor 1240
Decorative Wood 1302
Fire Resistant ss/fg Edge 1360
Structural Support Edge Layers 1362
Decorative Wooden Door 1402
Fire-Rated Metal Frame/Jamb 1404
Decorative Wood/Veneer 1502
Fire Resistant ss/fg Edge 1504, 1506
Sodium Silicate/Fiberglass Layer 1508
Structural Support Layers 1512
Structural Support Edge Layers 1514
Decorative Wood/Structural Support 1602
Sodium Silicate/Fiberglass Layer 1608
Decorative Wood/Veneer 1702
Fire Resistant ss/fg Edge 1704, 1706
Sodium Silicate/Fiberglass Layers 1708
Structural Support Layers 1712
Structural Support Edge Layers 1714
Decorative Wood/Veneer 1802
Sodium Silicate/Fiberglass Layer 1808
Structural Support Layers 1812

DETAILED DESCRIPTION

Figure 16:
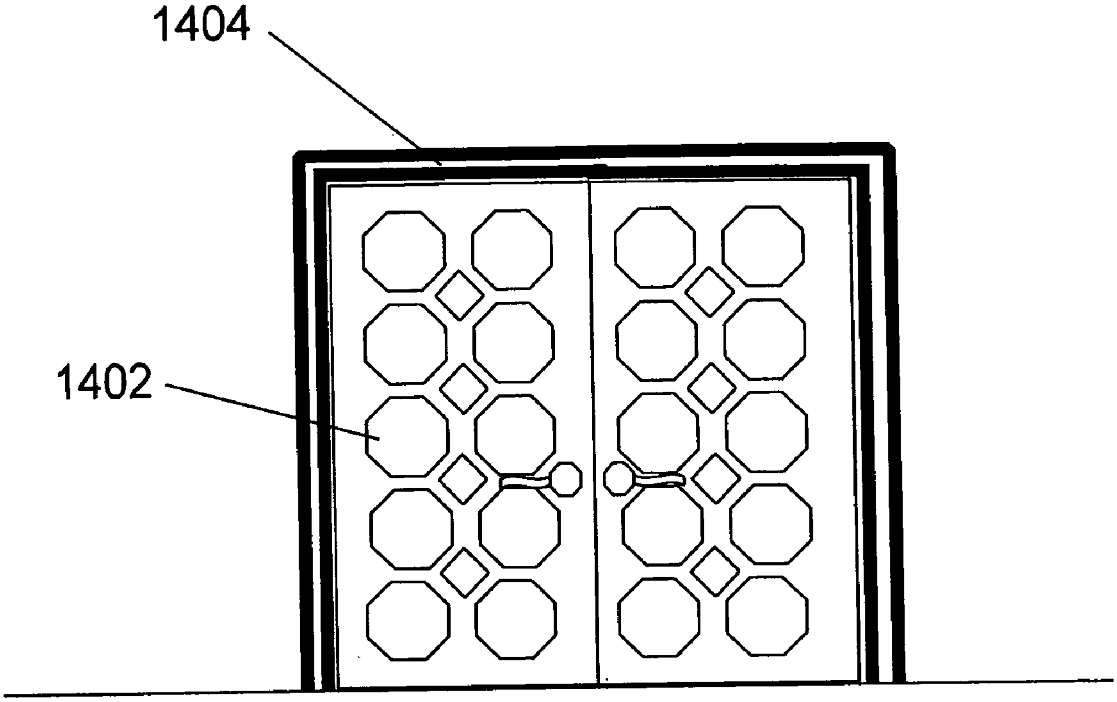
Figure 16 PRIOR ART
FIG. 16 is PRIOR ART, a simplified diagram of a decorative office doorway with two expensive wooden doors designed to pass fire rating tests and an ugly metal frame also designed to pass fire rating tests.

FIG. 16 is PRIOR ART, a simplified diagram of a decorative office doorway with two expensive wooden doors designed to pass fire rating tests and an ugly metal frame also designed to pass fire rating tests. Decorative wooden door 1402 has been built to withstand fire for a certain period of time. A "20 minute" door is one rated to withstand fire conditions for 20 minutes, a "45/60 minute" door is rated to withstand fire conditions for 45/60 minutes, and a "90 minute" door has been tested and rated to withstand 90 minutes of fire conditions.

Fire-rated metal frame/jamb 1404 is also able to withstand fire conditions for a long period of time, usually the frame/jamb is constructed to match the rating of the door. The unfortunate problem with this is that the frame is usually a relatively inexpensive steel construction, painted in a neutral institutional or wall color. The frame/jamb may not be a weak spot in terms of fire protection but it is less appealing than the door and walls.

Figure 2:
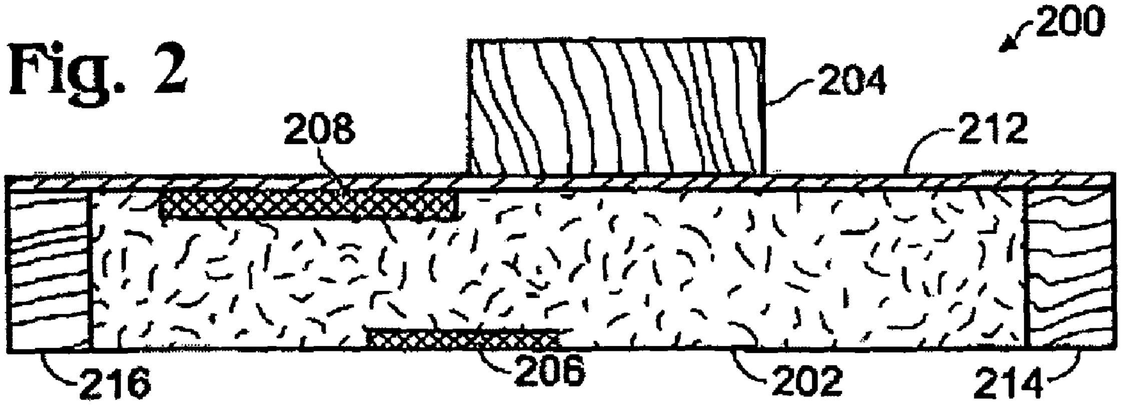
FIG. 2 is a PRIOR ART cross-sectional view of the device of the '466 system, based upon FIG. 11 of the '466 reference.
Figure 11:
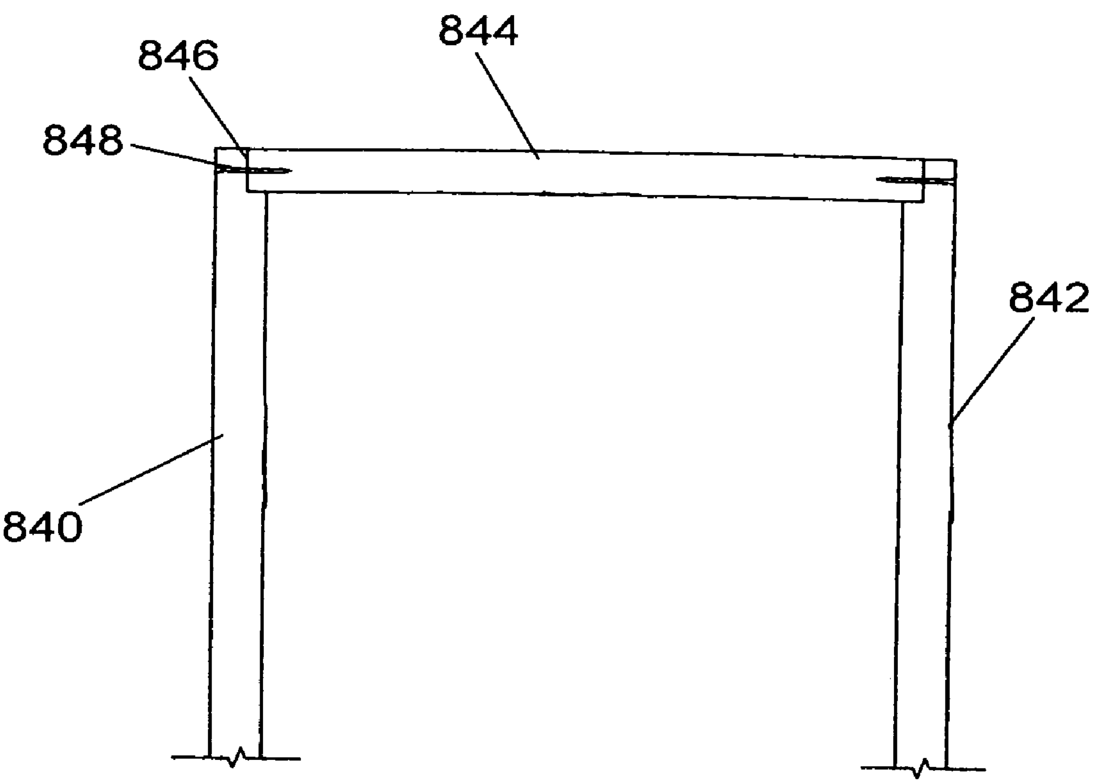
FIG. 11 is a side view of a door frame using the invention.

FIG. 1 is a PRIOR ART cross-sectional view and FIG. 2 is a PRIOR ART cross-sectional view of the device of the '466 system, based upon FIG. 11 of the '466 reference. This design is supposed to make up for some of the problems of a plain steel frame. Jamb area/system 80 has the actual jamb 82 and stop 92 which stops door 84, wall 86 is connected with the door via hinge 101.

Base fire-resistant board 90 is identified in the text of the '466 patent as being a fire resistant building material, that is, a structural material which is reasonably fire resistant but not intumescent nor primarily fire resistant. Small intumescent strips 94, 96 at or near the exterior of the device, in location in which they may serve to seal the door in the event of a fire.

However, hard board layer 98 must be fastened to special brackets 100, 104 and to metal plate 106 using longer screws 102, that is, the stop device is not actually connected to the wall in a normal way: special brackets are used to hold the device close to the wall. This is important: in construction, numerous extra steps are required in order to properly mount the device of the '466 reference. This drives up cost, labor and aggravation for the individuals installing the door.

Jamb system 200 of FIG. 2 (also the '466 reference) shows more clearly the actual operative parts of the jamb which must be supported by the special brackets and plates.

Base portion 202 supports stop 204 and also small intumescent strips 206, 208 and veneer 212 and wood ends 214, 216.

It is immediately obvious that this design lacks true layers of intumescent material: the narrow strips do not span the width of the device from edge to edge. There are no edge strips of any type to provide fire protection to the stop itself, and there is no interspersal of intumescent layers with structural layers.

Figure 12:
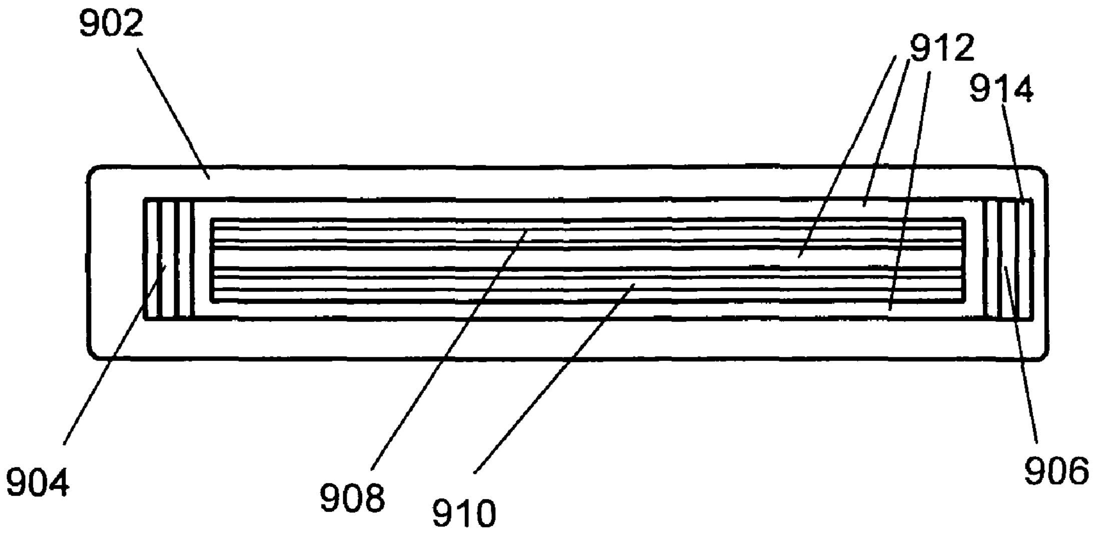
FIG. 12 is a cross sectional view of a core embodiment of the invention suitable for constructing other embodiments.

FIG. 12 is a cross sectional view of a core embodiment of the invention suitable for constructing other embodiments.

Decorative wood 902 may entirely surround the 45/60 minute rated jamb/frame core, or may only be used on one side. Fire resistant edges 904, 906 provide layers of intumescent material directed towards the likely orientation of encroaching fires, and may be supported or covered by structural support edge layers 914.

Sodium silicate/fiberglass layers 908, 910 span the width of the jamb/frame, unlike the narrow strips of the '466 reference, and are interspersed with structural support layers 912 which provide strength to the overall jamb/frame. Thicknesses may range from a minimum of about 1/70 inch up to 3/4 inch. (0.015 to 0.75 inch) Note that these layers are themselves actually built up of three smaller layers of the sodium silicate/fiberglass (sodium silicate/fiberglass) construct, that is, the overall layer is composed of sublayers. Other numbers of sublayers may be used, ranging from one to whatever number may be successfully adhered together.

The embodiment shown (a 45/60/90 minute rated device) has three structural layers, two intumescent layers, one intumescent edge strip at each side and two structural strips at each side, and is encased in decorative wooden materials, veneers or the like to provide an aesthetically pleasing door frame, thus obviating the problem of beautiful doors being mounted in ugly metal frames. Thus in the presently preferred embodiment and best mode presently contemplated for carrying out the invention, the door jamb/frame core is constructed of three panels of compressed particle board ("hardboard") and two fire resistant panels of the present invention across the width of the invention, with the depth of the invention crossed at the edges by the single fire resistant panels/edges and two panels/edges of hardboard at each end. The whole may then be covered with a decorative outer layer of wood or veneer.

This assembly may be bonded together using sodium silicate itself, thus providing additional sodium silicate in the construction beyond that present in the fire resistant panels. Other adhesives may be used to assemble the frame/jamb core. In addition, the layers may be pressed together immediately after being bonded. Multiple cores may be pressed at one time. Note that since sodium silicate is an effective glue, the stack by itself has some structural strength.

Note that pressing a single door frame element is possible but it is usually more practical to press several stacks at the same time, so that one pressing operation may produce several doors, frame, boards or other building materials. Since the exterior sides of the hardboard panels may have no sodium silicate on them, there is little adhesion between stacks, unlike within stacks.

After assembly, example cores in doorjamb/frames may be sent to a fire door testing and certification agency for that testing and certification. This testing may occur either for the core alone, for a jamb/frame with the core incorporated therein, or for a door and frame (possibly pre-hung) for testing as a unit. The core may be sent for certification in a construction of the thinnest possible wood or veneer: thereafter, any door having thicker wood or veneer is acceptable at the same rating without suffering certification. When a door manufacturer buys such a frame core, it has already been certified, thus greatly easing the burden on the door manufacturer. In contrast, makers building their own door cores out of PALUSOL as taught by the known art will not only have the burden and expense of building the cores but must overcome the fire door rating agency's testing for each new model of door. Taking a different tack, makers building using the PALUSOL based device of the '466 reference avoid that much difficulty but must still use special brackets in order to secure their relatively weak product to the door frames. Finally, and in contrast to both of the two previous options, the device of the present invention is quite strong and thus allows normal construction techniques.

In embodiments of the present invention the door frame/jamb core may have at least one structural layer selected from the group consisting of: hardboard, fiberglass cloth, carbon fiber, carbon fiber fabric, metal sheet, metal mesh, composite mesh, plastic panel, solid wood, MDF, plastic, polymer, composite, OSB, cardboard, HDF, particle board, gypsum, plywood, steel, metal and combinations thereof. Thus, hardboard is not the only possible material for the structural layers of the invention.

In FIG. 12, it may be seen that there may be narrow panels ("edges") at a 90 degree angle to the main door frame surface, one at each end: 906 and 904. These optional features may become necessary as sodium silicate based fire resistant panels largely expand perpendicular to the surfaces of the panels. The narrow end strip will expand under heat in the direction perpendicular to the surface of the frame, while the broader jamb strips will expand outward toward the door and inward into the void spaces left in the door frame, thus sealing the door into the jamb, sealing the jamb to the wall, and blocking the edges of the jamb device from the fire eating in from one edge or the other. However, these may not be necessary depending on construction parameters.

Figure 13:
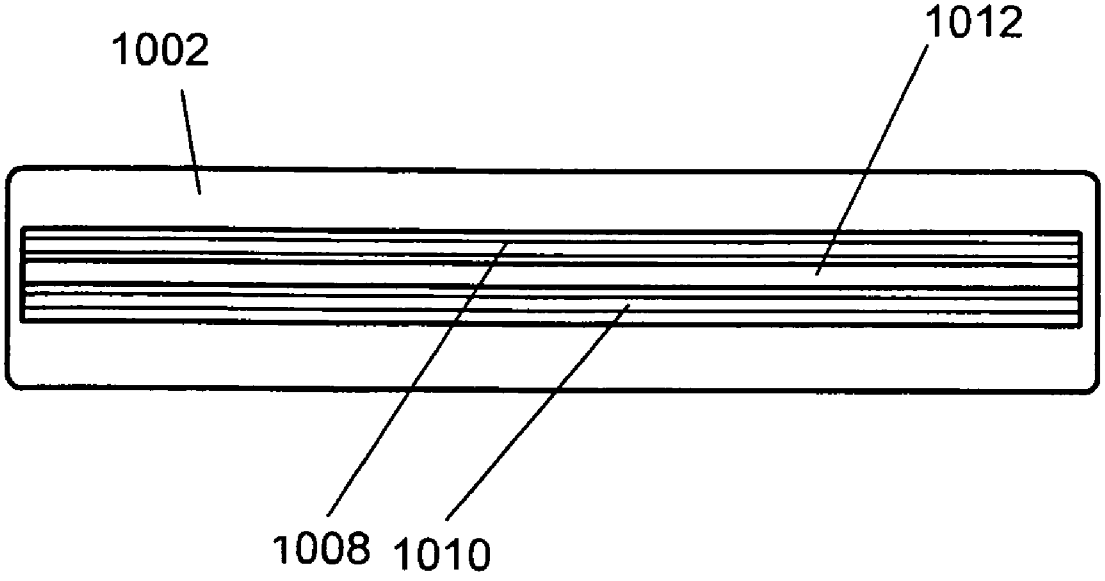
FIG. 13 is a cross sectional view of a core embodiment suitable for making other embodiments of the invention and lacking edge layers.

FIG. 13 is a cross sectional view of a core embodiment suitable for making other embodiments of the invention and lacking edge layers. Decorative wood 1002 has within it sodium silicate/fiberglass layers 1008, 1010 built up as previously described in reference to the previous embodiment (of FIG. 12). Structural support layer 1012 as noted previously is designed to hold the sodium silicate/fiberglass layers in place during fire and intumescence. The significant difference is that the device of the embodiment is less expensive and may be made thinner and narrower as it lacks the edge layers of the previous embodiment. Testing has revealed that a well designed jamb/frame core may meet testing requirements without the edge layers of reinforcement and intumescent material.

What is important is that these various panels will seal the door and thus also preventing smoke from jetting around the door and heat from passing the door via the edges. This edge sealing is mandatory under many regulatory schemes. What the door manufacturer does NOT have to do is build up the frame core out of fire resistant panels and hardboard, and the door manufacturer also does not have to get each new model of door frame rated, both significant savings in time and effort.

Thus, in the best mode now contemplated and the presently preferred embodiment, a door manufacturer may easily buy the pre-rated door frame/jamb of the present invention and use it as a core for a commercial door frame. Even a 45/60 minute core is only 1/4 inch to 5/8 inch (roughly 6.35 to 15.875 mm) thick, while a 20 minute core is only 3/16 of an inch thick (roughly 5 mm). A 90 minute jamb/frame core may be only 1/4 to 5/8 of an inch thick. The various frame components may be faced with hardboard on both faces, or may be faced with veneer, an excellent surface for receiving fasteners (especially compared to PALUSOL, which tends to be fairly weak). It is also an excellent surface to receive adhesives, which is a commercially important improvement over PALUSOL, as PALUSOL brand material does not accept standard woodworking adhesives.

Structurally, the frame core of the invention is much stronger than core of the '466 device. First, the invention frame core has exterior surfaces of hardboard, not PALUSOL, and thus has a stronger surface for attachment to the walls, studs, facings and so on. This also means that the core of the invention takes and holds normal fasteners such as screws better than a built up core would. As noted later in reference to FIGS. 3, 4 and 5, merely substituting slightly longer screws with plywood layers as needed allows the use of the invention directly without special equipment or special fasteners. Second, it has three hardboard panels providing additional strength. Thirdly, the fire resistant panels of the invention are strong panels comprising a tightly woven fiberglass impregnated with sodium silicate rather than the sodium silicate matrix of PALUSOL, which has a much looser and lighter use of loose individual fibers of fiberglass fabric/strands.

A tightly woven panel of fiberglass, for example, chop strand fiberglass, woven roving, pressed fiberglass, fiberglass fabric, fiberglass veil, and combinations thereof is provided. The panel is then saturated with hydrated sodium silicate, by rolling on, spraying on, submersion or any other methods. The term "approximately 40% hydrated" refers to the fact that 40% hydrated sodium silicate as sold may be hydrated in a range from 35% to 45%. Note that even 20% hydration can present a fire barrier, depending on application and circumstances. Obviously, sodium silicate having other degrees of hydration may be used in the method and construction of the device of the invention. The individual panels for the edge of the jamb or the larger panels crossing the width of the jamb may be cut from the finished panel or cut first and then manufactured separately.

The amount of hydrated sodium silicate applied to the tightly woven/chops strand fiberglass panel to produce the fire resistant panel is considered important. In some embodiments fully 0.9 gallons (approx. 3 liters) of hydrated sodium silicate is applied to a single panel of approximately 44 by 97 inches in dimension (roughly 112 cm×246 m). (This size is normally used to make a panel for an entire embodiment.) This is roughly 0.01 gallons of sodium silicate treatment per square foot, regardless of the size of the panel. This can be reduced, thus reducing fire resistance of the panel, but at some point the fire resistance of the panel becomes so low that the thickness of the door core/frame core made with the panel becomes commercially unacceptable or unacceptable under regulations. While it may be possible to produce a translucent panel by means of the current invention, this would be undesirable since light passing through provides a mechanism for radiation of heat as well, which insulation is supposed to prevent or resist. Smaller panels range in size from a few millimeters across (10 mm or less) for edge panels up to several inches or more across for very wide door jambs: in principle, there is not a lower limit on the width of edge panels nor an upper limit on the width of the panels spanning jambs: a door sill several feet in depth, with fire resistant jambs/frames several feet across, may easily be constructed, as the panels may be manufactured to size or cut down from panels as large as a door.

Treatment methods vary: in addition to rolling and spraying, soaking the hydrated sodium silicate onto the tightly woven fiberglass panel, curtain coating the hydrated sodium silicate onto the tightly woven fiberglass panel, and combinations thereof may be employed. The treated panel should be heavily sodium silicate by weight.

Figure 17:
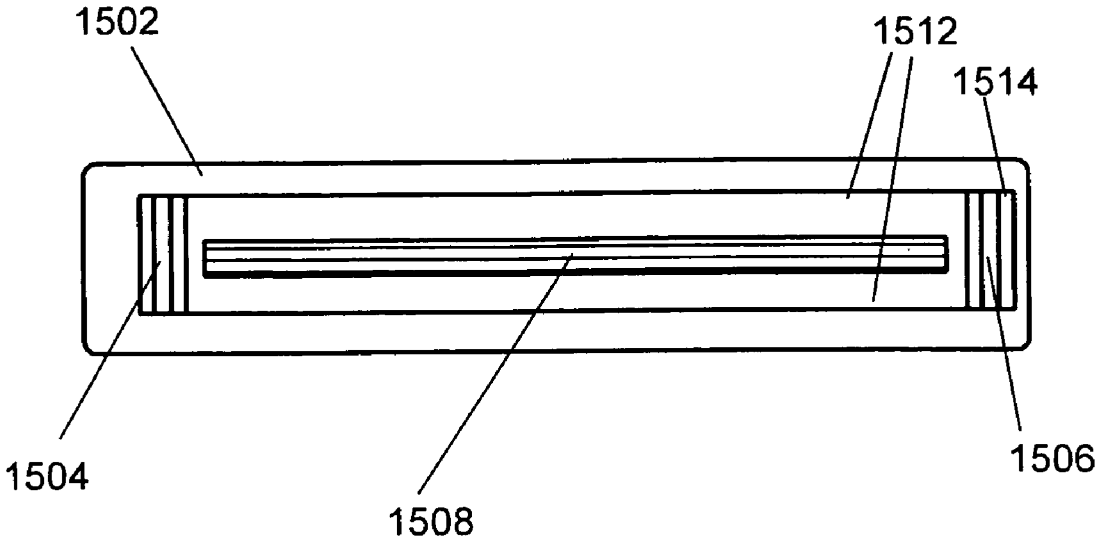
FIG. 17 is a cross sectional view of a core embodiment suitable for making other embodiments of the invention, the core shown suitable for a 20/45/60/90/120 minute door rating and showing edge layers.

A 20 minute doorjamb core made according to the invention may be only wood, or may be conceptually similar to the door frame core shown previously, however, it might have only one fire resistant layer of dried impregnated tightly woven fiberglass panel, not two, and also has two layers of hardboard, not three. FIG. 17 is a cross sectional view of a core embodiment suitable for making other embodiments of the invention, the core shown suitable for a 20/45/60/90/120 minute door rating and showing edge layers. Decorative wood or veneer 1502 covers the fire resistant core having fire resistant sodium silicate/fiberglass edges 1504, 1506 at both ends, along with structural support edge layers 1514, all set at a 90 degree angle to the main axis of the device, but having only a single sodium silicate/fiberglass layer 1508 between structural support layers 1512

The core embodiment of the invention may be used by secondary manufacturers to produce a wide range of building materials. For example, in frame applications it may be provided in set widths which are relatively narrow, perhaps a maximum width of 24 inches, much like a board. However, it is also possible to make a broad panel several feet wide, which secondary manufacturers can then cut down to a desired size or shape, which panel might be a wall panel, a door panel, etc, or could itself also be cut down by the secondary manufacturers to make frame material.

Figure 18:
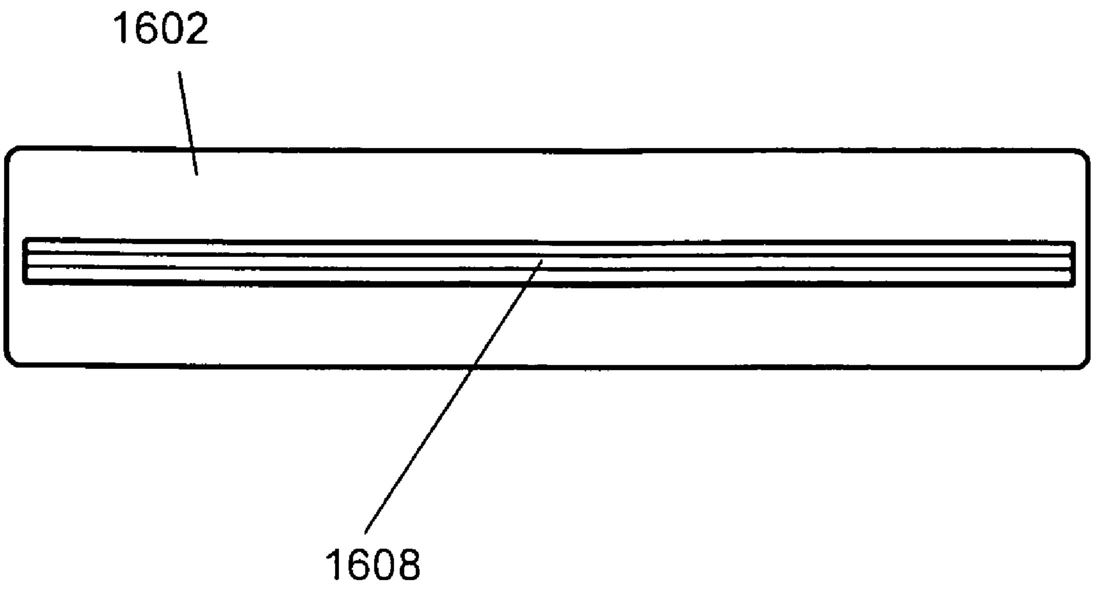
FIG. 18 is a cross sectional view of a core embodiment suitable for making other embodiments of the invention, the core shown suitable for a 20/45/60/90/120 minute door rating without edge layers.

FIG. 18 is a cross sectional view of a core embodiment suitable for making other embodiments of the invention, the core shown suitable for a 20/45/60/90/120 minute door rating without edge layers. In this embodiment the decorative wood 1602 might itself function as the structural support for sodium silicate/fiberglass layer 1608.

By this means, the cost and thickness of the frame core device may be reduced yet again, for example for use in embodiments in which there is very little space available for the frame/jamb.

Figure 14:
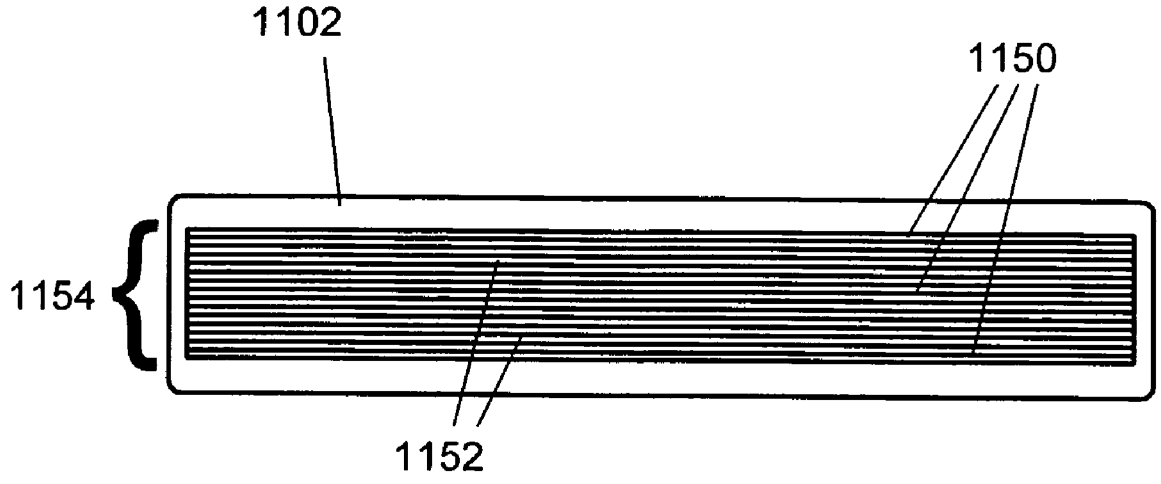
FIG. 14 is a cross sectional view of a core embodiment suitable for making other embodiments of the invention, the core shown suitable for a 90 minute door rating without edge layers.

FIG. 14 is a cross sectional view of a core embodiment suitable for making other embodiments of the invention, the core shown suitable for a rated door frame but without edge layers. Decorative wood 1102 and structural support layers 1150 and sodium silicate/fiberglass layers 1154 can be much as previously described, while silica fabric layers 1152 may provide a layer which retains the other layers despite adverse heat conditions. This extra layer embodiment could allow thinner individual layers or a higher rating (45/60/90/120 minutes) for a given thickness.

Figure 15:
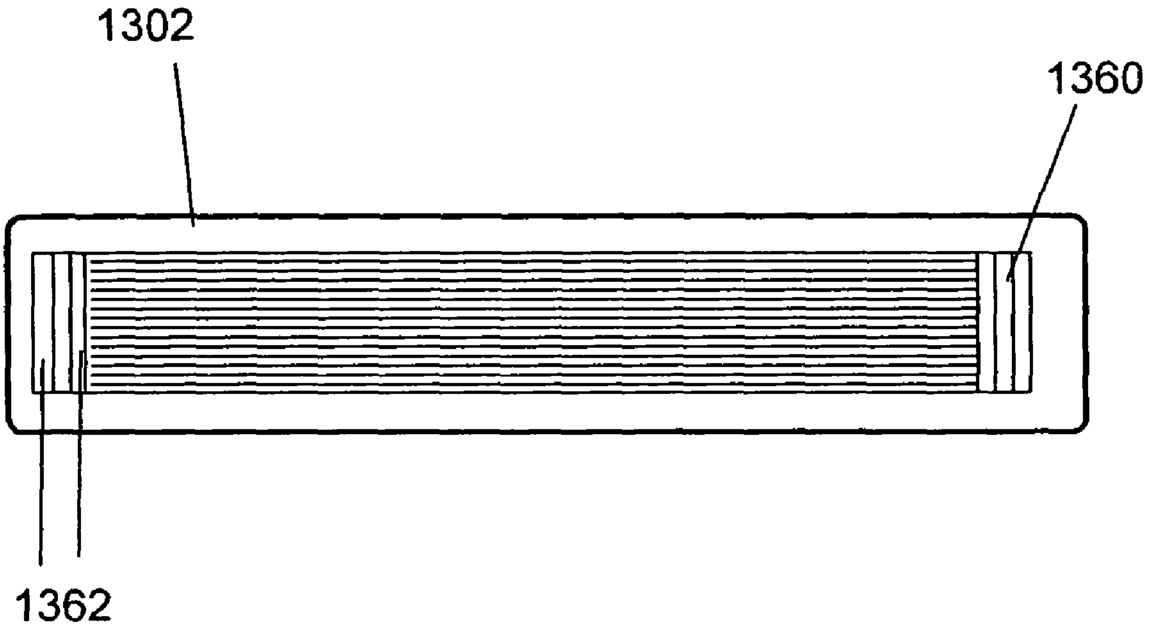
FIG. 15 is a cross sectional view of a core embodiment suitable for making other embodiments of the invention, the core shown suitable for a 90 minute door rating having edge layers.

FIG. 15 is a cross sectional view of a core embodiment suitable for making other embodiments of the invention, the core shown suitable for a rated structural member but having edge layers. Decorative wood 1302 has fire resistant sodium silicate/fiberglass edge 1360 and structural support edge layers 1362. Like the edgeless embodiments (such as in FIG. 14) it may be used for a door frame, door jamb, or other structural building members.

Figure 19:
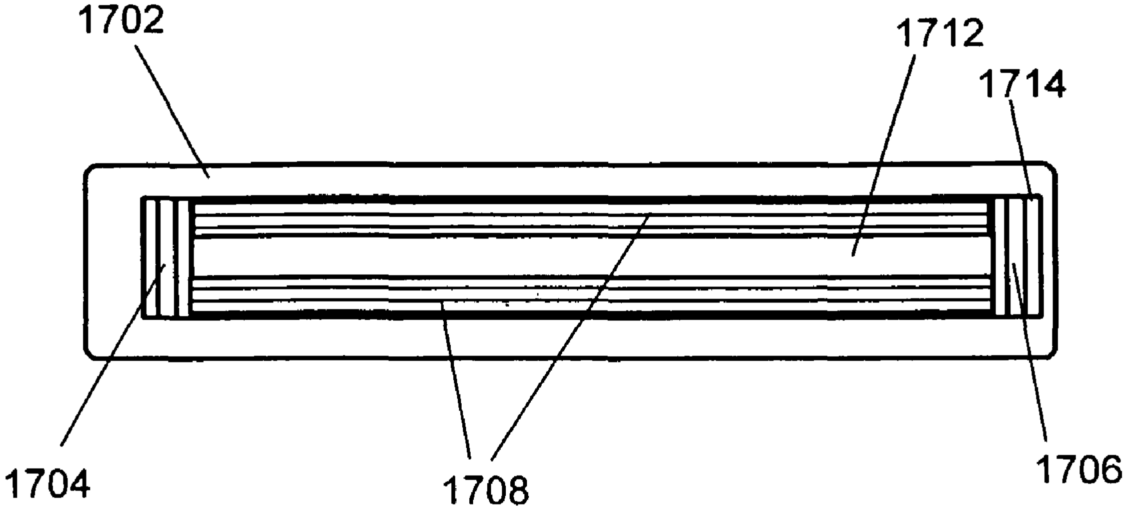
FIG. 19 is a cross sectional view of a core embodiment suitable for making other embodiments of the invention, the core having edge layers.

FIG. 19 is a cross sectional view of a core embodiment suitable for making other embodiments of the invention, the core having edge layers. Optionally decorative wood/veneer 1702 may cover the operative components such as fire resistant sodium silicate/fiberglass edge 1704, 1706, sodium silicate/fiberglass layer 1708, structural support layers 1712, and optional structural support edge layers 1714.

Figure 20:
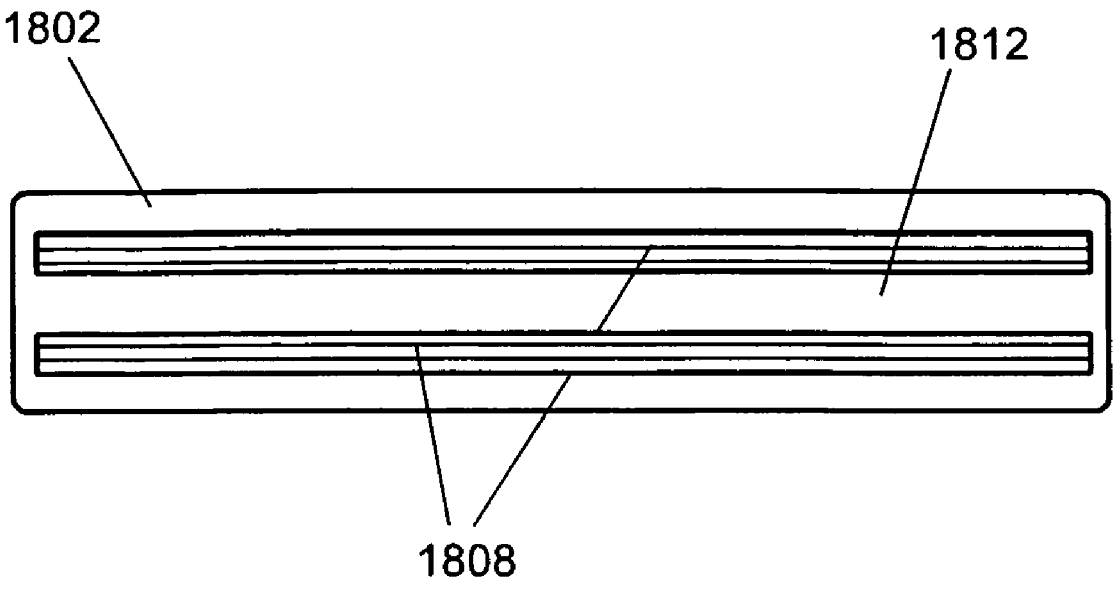
FIG. 20 is a cross sectional view of a core embodiment suitable for making other embodiments of the invention, the core having no edge layers.

FIG. 20 is a cross sectional view of a core embodiment suitable for making other embodiments of the invention, the core having no edge layers. Note that in edgeless embodiments like this, the main layers 1808/1812 may extend closer to the sides of the structural member (beam, joist, fireblock, whatever). Decorative wood/veneer or outside cover 1802 may hold the sodium silicate/fiberglass layers 1808 and the structural support layers 1812 invisible and thus present the appearance of an ordinary piece of lumber such as a 1×6 or 2×4.

Figure 3:
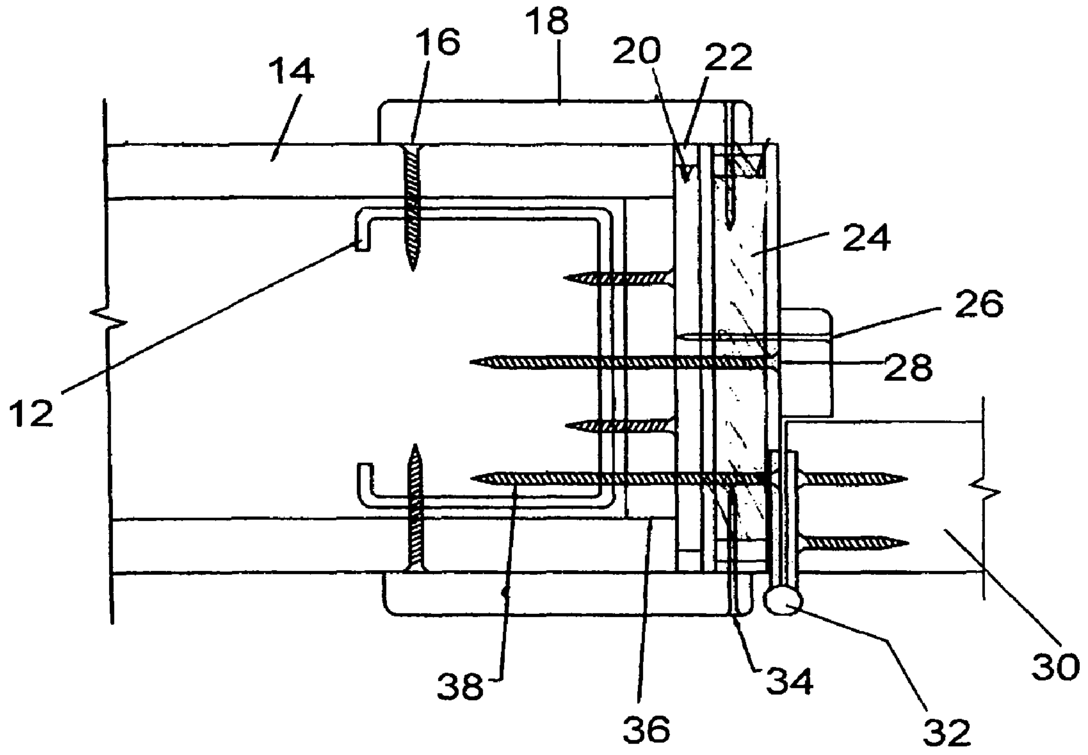
FIG. 3 is a cross-sectional view of the method of mounting the invention on a steel stud building construction, on the hinge side of the doorway.

FIG. 3 is a cross-sectional view of the method of mounting the device on a steel stud building construction.

Metal stud 12 is simply not normally strong enough to withstand the loads imposed by fire conditions: a building fire easily pulls screws straight out of a standard metal building stud as the fire pushes and pulls on the door, thus normally a piece of plywood 36 is used as a face to the metal: the plywood gives the screws and nails (16, 26, 34, 38) more purchase and actually provides strength and fire resistance to the metal stud itself. Wallboard 14 may be standard wall material, and casing trim 18 may also be standard material.

Shim space 20 allows the installer to "shim" the door into place, that is, to get a good square fit with the door. Even in the $21^{st}$ century, "hanging" a door is still a careful manual process which requires a skilled worker to align the door by eye and instrument: even pre-hung doors require some similar work at the time of installation. Caulk 22 seals the shim space visually, but in the event of a fire, the shim space becomes an easy avenue for fire to pass the door, and thus shim spaces must be sealed by fire rated door frames/jambs.

Fire resistant jamb core 24 has layers of intumescent material which expand both towards the door and into the shim space in the event of fire, thus sealing the doorway so that deadly smoke cannot pass.

Stop 28 stops door 30 as it moves on hinge 32. Plywood panel 36 is as used in standard construction.

Unlike the device of the '466 reference, which requires special brackets and plates for door hanging, the device of the present invention merely needs a longer screw 38 for proper hanging, due to the invention's greater structural strength. This greater strength in turn is largely due to the differences between the intumescent layers of the invention (tightly woven or chop strand fiberglass) and the intumescent strips of PALUSOL(R) used in the '466 reference, which cannot be used in large areas due to their low strength, itself due to the fact that PALUSOL(R) is made of loose and disorganized fibers.

Figure 4:
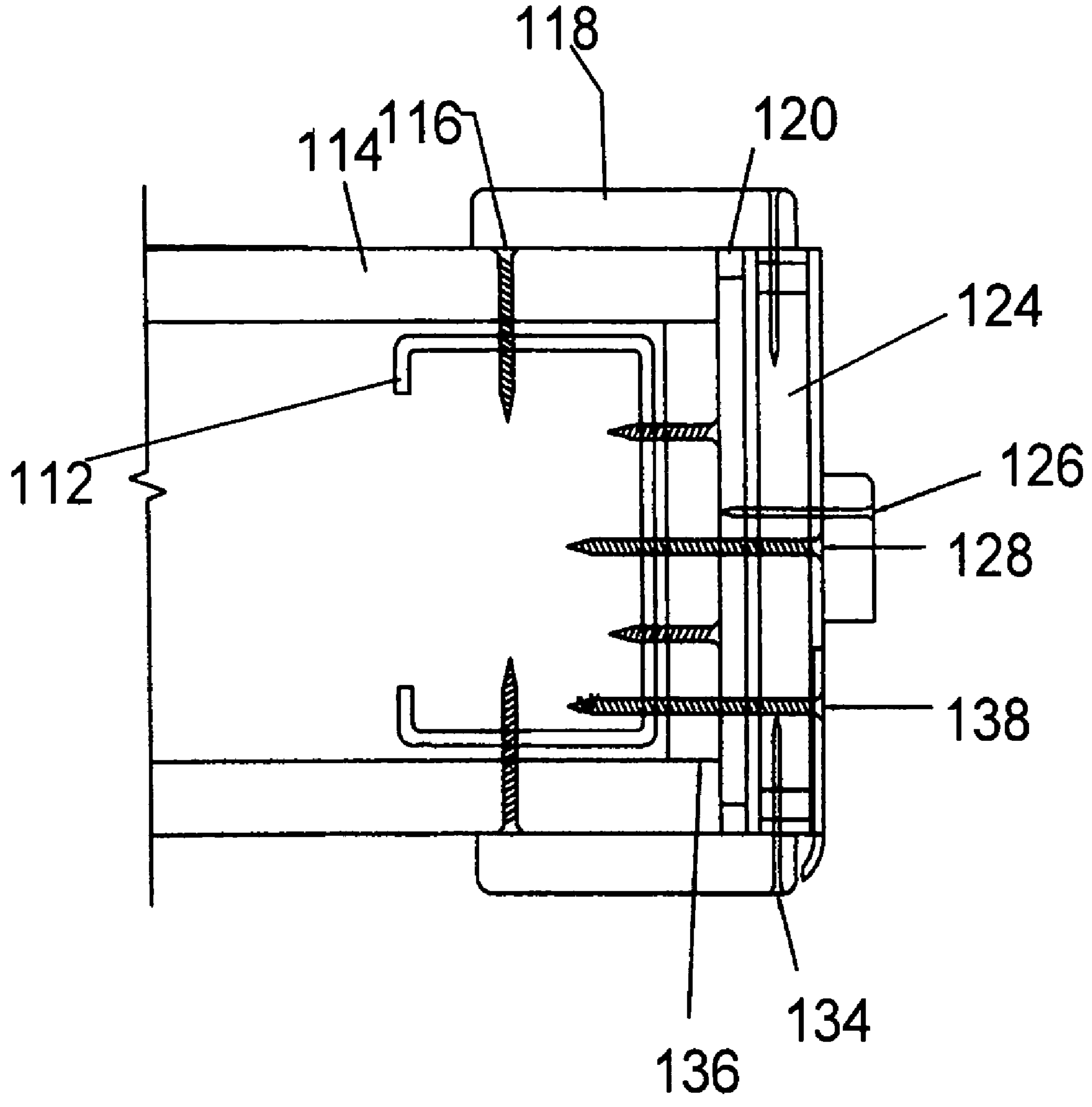
FIG. 4 is a cross-sectional view of the method of mounting the invention on a wallboard building construction on the strike side of the doorway.

FIG. 4 is a cross-sectional view of the method of mounting the device on a wallboard/steel stud building construction. As may be seen, the invention may be normally mounted on the "strike side" (latch side) of the doorway as well, so a frame of the material may be used on both sides of the door, that is, on the latch side and on the hinge side both.

Metal stud 112, wallboard 114, screws and nails 116, 126, 134, and longer screw 134 may be substantially as described in reference to the mounting of the frame in regard to the hinge side. Casing trim 118, shim space 120, fire resistant jamb core 124, stop 128 and plywood sheet 136 may also be as described, and again, longer screw/fastener 138 is the only concession to extra security in using the device: no metal plates nor brackets are necessary (a clear improvement when compared to FIG. 1, which shows the '466 reference).

Figure 5:
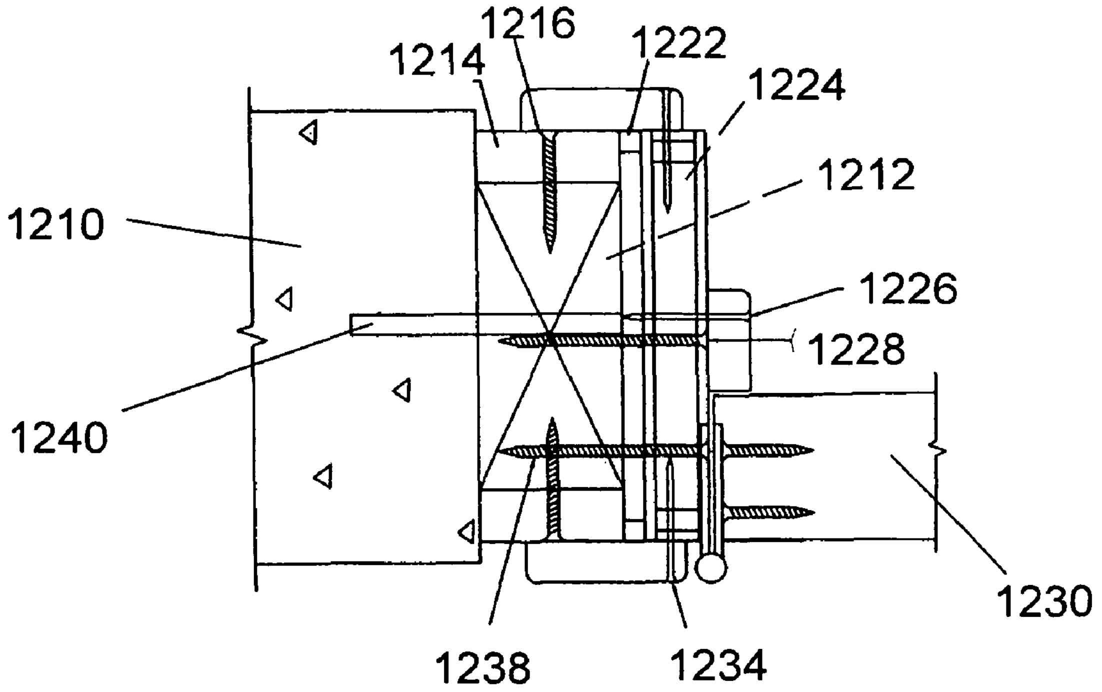
FIG. 5 is a cross-sectional view of the method of mounting the invention on a masonry/wood building construction.

FIG. 5 is a cross-sectional view of the method of mounting the device on a masonry/wood building construction.

Masonry wall 1210 ends with 2×4 (2×6, 2×8, etc) wood stud 1212 but otherwise, wallboard 1214, screws 1216 and nails 1226, 1234, caulk 1222 (and the dangerous shim space concealed thereby) fire resistant jamb core 1224, stop 1228, and the rest, including longer screw/fastener 1238 may be substantially as described.

As is normal in masonry construction, masonry anchor 1240 may be used to secure the stud and assembly to the masonry wall, but this is not a factor of the invention but rather a normal part of the method of mounting.

Figure 6:
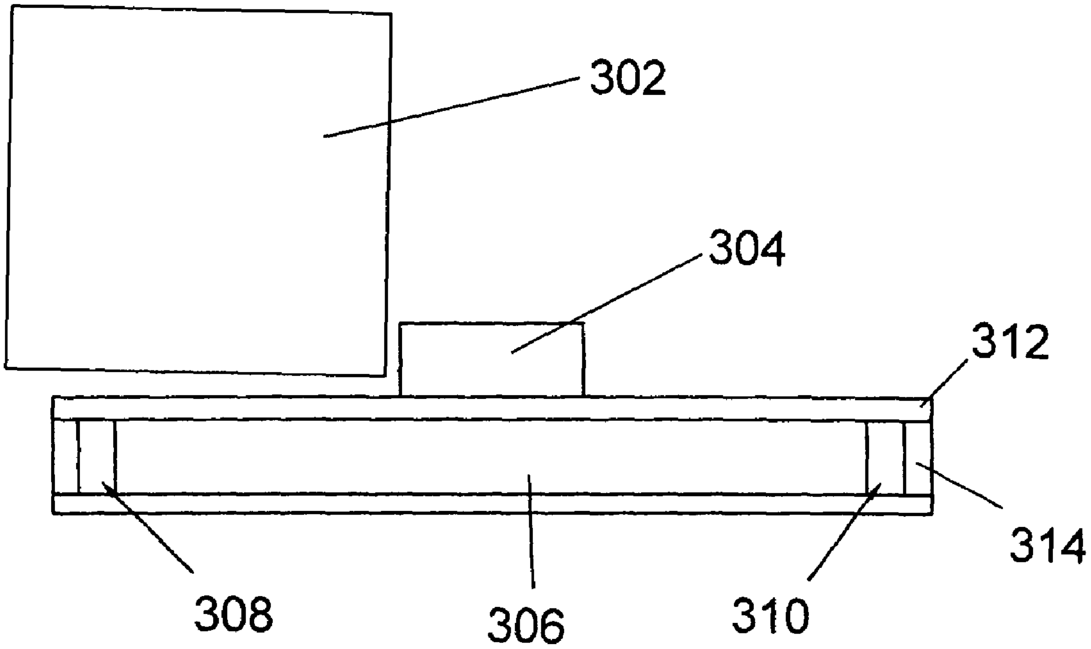
FIG. 6 is a cross-sectional view of a double rabbet flat laminated jamb embodiment of the invention.

FIG. 6 is a cross-sectional view of a double rabbet flat laminated stop embodiment of the invention. Door 302 is stopped at stop 304. Core 306 and fire resistant edges 308, 310, along with structural support layers such as solid wood 312, 314 may be displayed or concealed.

Figure 7:
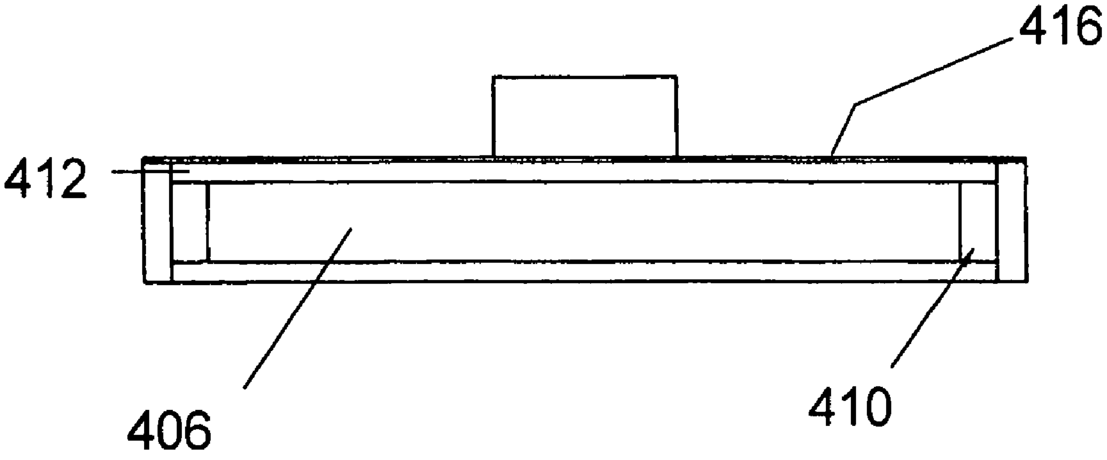
FIG. 7 is a cross-sectional view of a double rabbet flat veneer embodiment of the invention.

For example, FIG. 7 is a cross-sectional view of a double rabbet flat veneer embodiment of the invention, substantially as shown in FIG. 6 (see core 406, fire resistant edge 410, MDF 412). Veneer 416 may serve to provide an extremely thin (less than 1 mm, if desired) concealment of the fire resistant and strong materials beneath.

Figure 8:
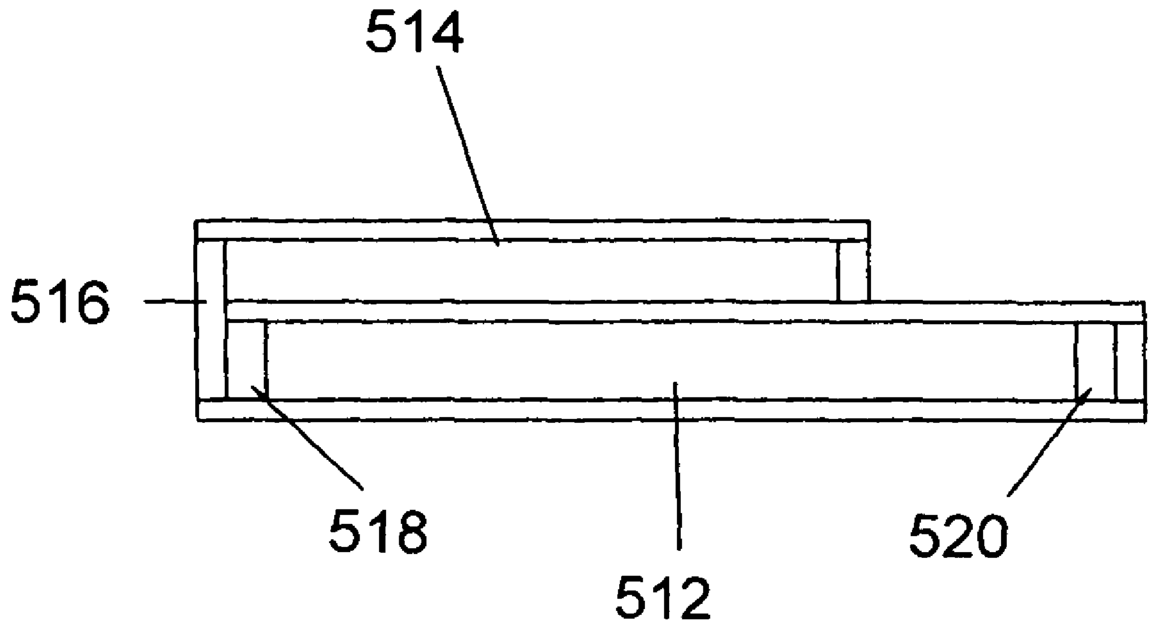
FIG. 8 is a cross-sectional view of a single rabbet flat laminated flat embodiment of the invention.

FIG. 8 is a cross-sectional view of a single rabbet flat laminated flat embodiment of the invention. Core 512, MDF or wood stop 514 and fire resistant edges 518, 520 may be substantially as shown and described previously, however, wood layers such as exemplary layer 516 may be used, or stop 514 may be solid wood instead of MDF, thus providing the device with an absolutely improved appearance versus devices with exposed PALUSOL(R), metal stop structures or the like.

Figure 9:
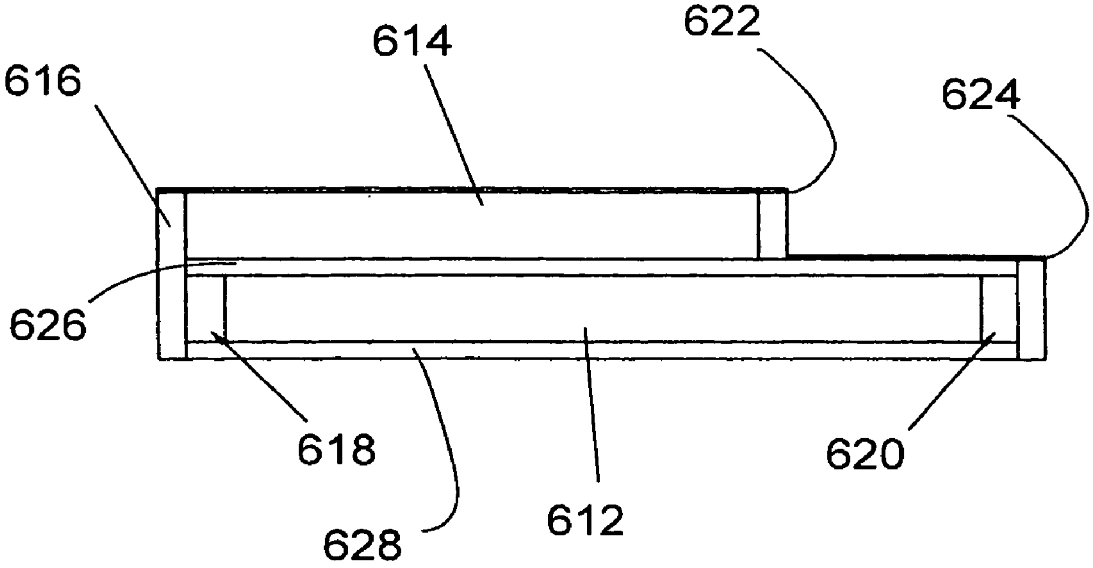
FIG. 9 is a cross-sectional view of a single rabbet veneer embodiment of the invention.

FIG. 9 is a cross-sectional view of a single rabbet veneer embodiment of the invention. The core 612 itself (the fire resistant package), the MDF/wooden stop 614 and wood 616, and fire resistant edge 618, 620 may be as described, with the addition of veneer 622, 624 as well.

Obviously the different embodiments offer different levels of appearance and cost, but all share the same fire resistant core (FIG. 12) which allows easy customization.

Figure 10:
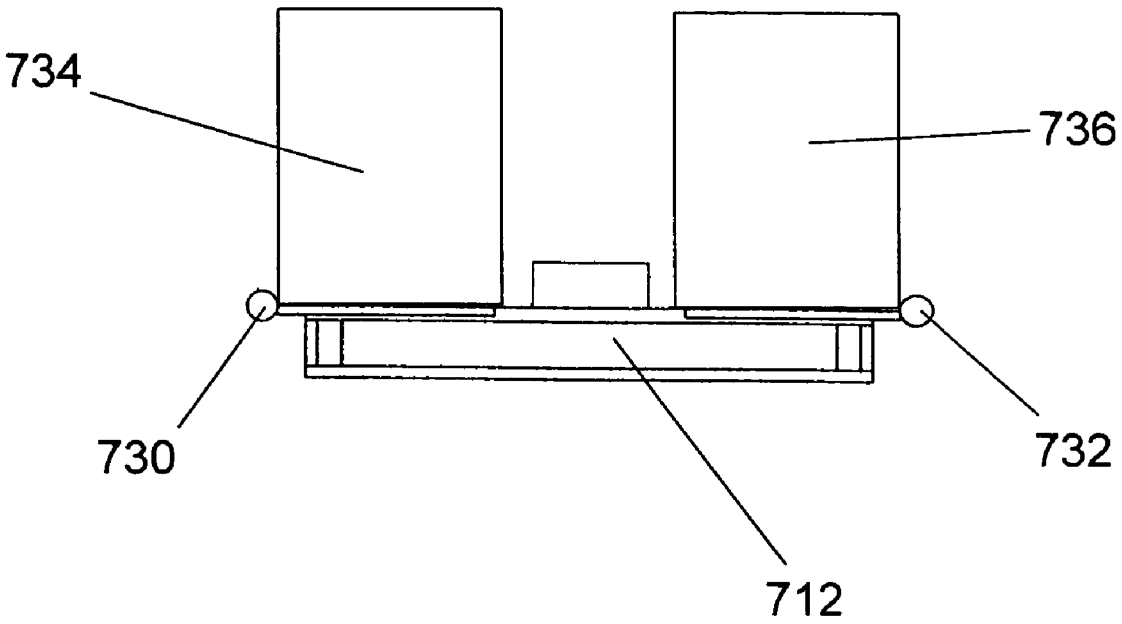
FIG. 10 is a cross-sectional view of a communicator frame embodiment of the invention.

FIG. 10 is a cross-sectional view of a communicator frame embodiment of the invention. Fire core 712 supports two hinges 730, 732 and thus two doors 734, 736.

FIG. 11 is a side view of a door frame using the invention. Jamb legs 840, 842 support header 844 by means of groove/dovetail 846 and nails such as nail 848. Each and every component may be made of the fire rated jamb/frame of the invention, thus simplifying enormously the task of construction, lowering costs, and increasing fire safety by making proper installation of the frame parallel normal installation of a frame. Fire door construction may further be simplified, as the fire door may not need to have as much edge protection as otherwise.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the claims.

I claim:

1. A fire resistant frame core, the core comprising:

first and second tightly woven fiberglass layers each treated with at least 0.01 gallons of approximately 20% hydrated sodium silicate per square foot of tightly woven fiberglass layer;

a third structural support layer interposed between the first and second layers;

the layers secured together.

2. The fire resistant frame core of claim 1, wherein the maximum width of the core is 24 inches.

3. The fire resistant frame core of claim 1, wherein the minimum thickness of the core is 0.1 inches.

4. The fire resistant frame core of claim 1, further comprising:

a first edge layer disposed at a first edge of the frame core, the first edge layer being oriented at 90 degrees to the first, second and third layers, the first edge layer being the same material as the first and second treated fiberglass layers; and a second edge layer also disposed a the first edge of the frame core, the first edge layer also oriented at 90 to the first, second and third layers, the second edge layer being the same material as the third structural support layer.

5. The fire resistant frame core of claim 1, wherein the third structural support layer further comprises one member selected from the group consisting of: solid wood, MDF, plastic, polymer, composite, OSB, cardboard, HDF, particle board, gypsum, plywood, steel, metal and combinations thereof.

6. The fire resistant frame core of claim 4, further comprising:

fourth and fifth treated fiberglass layers parallel and fastened to the first, second and third layers, a sixth structural support layer and third and fourth edge layers disposed at a second edge of the frame core and also oriented at 90 degrees to the first, second and third layers.

7. The fire resistant frame core of claim 1, further comprising:

an adhesive compound to secure the layers together.

8. The fire resistant frame core of claim 7, wherein the adhesive comprises: approximately 40% hydrated sodium silicate.

9. The fire resistant frame core of claim 1, wherein the first tightly woven fiberglass layer further comprises:

chop strand, woven roving, pressed fiberglass, fiberglass fabric, fiberglass veil, and combinations thereof.

10. The fire resistant frame core of claim 1, further comprising:

an additional layer of structural support, the additional layer of structural support being silica fabric.

11. The fire resistant frame core of claim 1, further comprising:

at least one decorative exterior layer.

12. A fire resistant frame core, the core comprising:

first and second structural support layers;

a third tightly woven fiberglass layer treated with at least 0.01 gallons of approximately 20% hydrated sodium silicate per square foot of tightly woven fiberglass layer;

the third layer interposed between the first and second layers; and the layers secured together.

* * * * *